United States Patent [19]

Tourneur, deceased

[11] Patent Number: 4,538,097
[45] Date of Patent: Aug. 27, 1985

[54] PROCESS AND APPARATUS FOR RECOVERING ENERGY, IN THE FORM OF ELECTRIC ENERGY, FROM A MOTOR TEST BENCH

[75] Inventor: Auburt Tourneur, deceased, late of Pontault Combault, France, by Monique Tourneur, legal representative

[73] Assignee: Appareillages et Materiels de Servitudes, Fresnes, France

[21] Appl. No.: 335,769

[22] Filed: Dec. 30, 1981

[30] Foreign Application Priority Data

Dec. 30, 1980 [FR] France ................. 80 27813

[51] Int. Cl.³ .............................. G01L 3/00
[52] U.S. Cl. ................. 318/490; 73/862.17; 73/862.18
[58] Field of Search ............. 290/40 C, 40 B, 40 R, 290/4 A, 40 A; 318/490; 73/862.12, 862.13, 862.14, 862.15, 862.16, 862.17, 862.18, 862.23; 123/395; 364/431.01, 431.02, 431.03, 431.07

[56] References Cited

U.S. PATENT DOCUMENTS

| | | | |
|---|---|---|---|
| 1,892,295 | 12/1932 | Walker | 73/862.17 |
| 2,440,076 | 4/1948 | Cassidy | 318/148 |
| 2,943,481 | 7/1960 | Winther | 73/862.11 |
| 3,456,498 | 7/1969 | Jaeschke | 73/116 |
| 4,335,619 | 6/1982 | Wetzel | 73/862.17 |
| 4,466,294 | 8/1984 | Bennington et al. | 73/862.13 |

FOREIGN PATENT DOCUMENTS

| | | | |
|---|---|---|---|
| 2310555 | 12/1976 | France | 73/862.18 |
| 2413651 | 7/1979 | France | |
| 0576654 | 4/1946 | United Kingdom | 73/862.11 |
| 0696152 | 8/1953 | United Kingdom | 73/862.18 |
| 1032497 | 6/1966 | United Kingdom | |

Primary Examiner—William M. Shoop
Assistant Examiner—Bentsu Ro
Attorney, Agent, or Firm—Sandler & Greenblum

[57] ABSTRACT

A process and an apparatus for the recovery of energy, in the form of electricity, from a engine on a test bench. The apparatus includes, in particular, a brake coupled to the engine being tested, and an asynchronous motor/-generator or dynamo connected to the distribution network to be supplied, a rotational velocity sensing apparatus provided at the output shaft of the engine, and a torque sensing apparatus. The apparatus also includes a coupler to achieve a selectively variable coupling between the brake and the asynchronous motor/generator or dynamo, while an electronic control and operating mechanism or controller, such as a computer, is provided to receive the signals from the velocity sensing apparatus and the torque sensing apparatus so as to assure the desired control of the velocity and/or of the torque, and to control the placement in operation or out of operation of the brake and/or the coupler.

The invention likewise relates to a process for the recovery of energy utilizing such an apparatus. The process comprises the steps of progressively removing the braking torque of the brake and simultaneously increasing the degree of coupling of the dynamo to the output shaft so that the torque, as seen by the engine, remains constant and only the dynamo is coupled to the engine at a predetermined synchronous speed, and operating the dynamo as a generator.

26 Claims, 3 Drawing Figures

PROCESS AND APPARATUS FOR RECOVERING ENERGY, IN THE FORM OF ELECTRIC ENERGY, FROM A MOTOR TEST BENCH

BACKGROUND OF THE INVENTION

1. Field of the Invention

The invention generally relates to a process and apparatus for recovering energy, in the form of electrical power, from an engine on a test bench, and more particularly from thermal vehicular engines.

2. Description of the Prior Art

It is necessary to perform measurements on engines at the factory in order to test their operation and/or endurance.

These factory tests, to be representative of the operational conditions experienced during use, must be performed under varying speed and torque conditions. Generally, the braking torque used to perform these tests is obtained, for example, by means of a friction brake, by a "Froude" water brake or by an electromagnetic Foucault current brake.

The energy furnished by the engine during the test is measured, the measured energy corresponding to the approximate efficiency of the engine. The energy expended is, generally, removed by the circulation of cooling water in the brake and, as a result, is lost.

Thus, a considerable amount of energy is wasted, and it is for this reason that it is desirable to recover at least a portion of this energy.

However, it is particularly difficult to reuse the recovered energy on location, for example in the form of heat, and therefore, it has become apparent that a particularly desirable manner of recovering this energy resided in its transformation into electric energy in a manner so as to be able to reinject it directly into the electrical network of the factory.

There presently exists a certain number of techniques directed to the transformation of the mechanical power of a variable velocity engine into a fixed frequency electrical power.

The known techniques include hydraulic apparatus having hydrostatic transmissions, and mechanical velocity adjusters, or slip clutches, which are adapted to turn an asynchronous generator connected to an electrical network.

There also exists entirely electric apparatus such as the Ward Leonard system or others provided, for example, with a generator and an inverter, or with an alternator, with a rectifier and with an inverter, or with an asynchronous or synchronous motor, with a rectifier and with an inverter.

However, a system of the Ward Leonard type is a costly system comprising two continuous-current machines whose maintenance is difficult and which require connection to an asynchronous generator which feeds the network. The above-noted apparatus is provided with inverters generally having thyristors, which produce strong harmonics causing undesirable disturbances to the network into which the current is reinjected.

SUMMARY OF THE INVENTION

It is for this reason that the present invention proposes an apparatus and process for the recovery of energy, in the form of electrical energy, from an engine on a test bench which comprises, in particular, a brake coupled to the engine being tested, an electric asynchronous motor/generator or dynamo connected to the distribution network to be supplied, a rotational velocity sensing apparatus provided at the output of the test engine, and a torque sensing apparatus.

Amongst others, the apparatus of the invention has the following advantages: (1) the current recovered is sinusoidal; (2) the injected current is practically free from undesirable harmonics; and (3) the current frequency is in synchronism with the frequency of the AC current of the electrical network. The current produced thus does not disturb particularly sensitive apparatus such as electronic assemblies.

An additional advantage provided by the invention is its insensitivity to the vibrations of the test engine.

Yet another advantage is that the apparatus is reversible, and can be used to start up or to break-in the test engine.

Further, civil engineering considerations are less important than was previously the case.

Maintenance requirements are reduced, and correspond to the maintenance requirements of a triphase motor (no slip ring).

Still another advantage resides in the energy savings experienced.

Further, a less substantial cooling circuit is required.

To achieve these and other objects, advantages, and features of the invention, the apparatus according to the present invention is notable in that it comprises a variable velocity electromagnetic coupler adapted to provide a controlled coupling between the brake and the asynchronous dynamo or motor/generator. An electronic control and operating mechanism or controller, such as a programmed computer, is provided to receive the signals from the velocity and torque sensing apparatus so as to assure the desired control in speed and/or torque and to control the start-up or shut-down of the brake and/or of the coupler.

According to a preferred embodiment, the controller is adapted to simultaneously control both the progressive removal of the brake or of the coupler, and the progressive replacement in operation of the coupler or the brake at certain predetermined rotational velocities. This is accomplished such that the torque, as seen from the engine, remains practically constant.

With an apparatus of this type, provided with an asynchronous motor/generator or dynamo having at least a single synchronous velocity, the present invention also relates to a process for the recovery of energy, the process comprising the steps of:

(a) loading the engine being tested solely with the brake by means of the controller when the output rotational velocity of the engine is less than a predetermined synchronous velocity (Vs);

(b) starting up the asynchronous motor/generator or dynamo immediately after the beginning of the test or beginning with the velocity (V1) slightly less than the predetermined synchronous velocity (Vs), the motor/generator or dynamo functioning then as a motor;

(c) simultaneously controlling, on the one hand the progressive removal of the braking action, and on the other hand the progressive placement in operation of the coupler, beginning with the predetermined synchronous velocity (Vs) and up until the velocity (V2) greater than (Vs), as a result of which only the coupler is in operation, such that beginning with the predetermined synchronous velocity (Vs), the asynchronous motor/generator or dynamo functions as a generator and furnishes the energy to the network;

(d) accomplishing the reverse operations in the course of a decrease in the rotational velocity of the engine; and (e) performing during the tests all of the desired measurements.

However, according to a preferred embodiment of the apparatus, the asynchronous motor/generator or dynamo is provided with at least two predetermined synchronous velocities (Vs1) and (Vs2), a communication control being provided to pass from one to the other.

With an apparatus of this type, the recovery process is remarkable in that it comprises the steps of:

(a) loading the engine being tested only with the brake by means of the controller when the output velocity of the engine is less than an initial predetermined synchronous velocity (Vs1);

(b) starting up the asynchronous motor/generator or dynamo at its first synchronous velocity (Vs1) immediately after the start-up of the test or beginning with a velocity (V1) slightly less than the velocity (Vs1), the motor/generator or dynamo then operating as the motor;

(c) simultaneously controlling, on the one hand the progressive removal of the action of the brake, and on the other hand the placement in operation of the coupler, beginning with the first synchronous velocity (Vs1) and until the velocity (V2) greater than (Vs1) after which only the coupler is in operation, such that after the velocity (Vs1) the asynchronous motor/generator or dynamo functions as a generator and furnishes energy to the network;

(d) simultaneously controlling, on the one hand the progressive stopping action of the coupler and, on the other hand the placement in operation of the brake beginning with a velocity (V3) of the engine, less than the second synchronous velocity (Vs2) and until a velocity (V4) less than or substantially equal to (Vs2) but greater than (V3) and after which only the brake is in operation;

(e) switching the asynchronous motor/generator or dynamo to its second synchronous velocity (Vs2) between the velocities (V4) and (V5), this last velocity being greater than or substantially equal to (Vs2), the brake being then the only one in operation;

(f) simultaneously controlling, on the one hand the progressive removal of the braking action and, on the other hand the placement in operation of the coupler beginning at the velocity (V5) and until the velocity (V6) greater than (V5) after which only the coupler is in operation, such that the asynchronous motor/generator or dynamo functions as a generator at the velocity (Vs2) and furnishes energy to the network;

(g) selectively restarting the operations from step (d) for other, greater synchronous velocities;

(h) accomplishing the reverse operations in the course of a decrease of the velocity of the engine; and (i) performing, during the tests, all of the desired measurements.

Preferably, the electromagnetic coupler and/or the brake are of the Foucault current type, and are each controlled by varying their excitation current.

Furthermore and preferably, a vertification device of the power to the electrical network is provided to measure the possible power of recovery and to act on the controller of the brake-coupler assembly in a manner so as to ultimately control the operation of either the brake alone, or the coupler and the generator; or the brake, the coupler and the generator, as a function of the possible power to be returned to the network.

In this case, the methods mentioned above are furthermore remarkable in that they likewise permit the brake to function at the same time as the coupler when the electrical network cannot accept a maximum recovery of the apparatus and to prevent any operation of the coupler when no power can be recovered.

In accordance with the invention, an apparatus for recovering energy, in the form of electrical energy, from an engine on a test bench comprises torque control means for controlling the torque applied to an output shaft of the engine, the torque control means including brake means for applying a braking torque to the output shaft of the engine, and electromagnetic coupling means for varying the degree of coupling of the coupling means to the output shaft of the engine.

The apparatus further comprises electrical power generating means to be connected to a power network to be supplied, the generating means being connected to be driven by the coupling means.

The apparatus further comprises switching means for controlling the connection of the generating means to the network to be supplied so that the generating means is connected to the network to supply a current having a frequency which is an integral multiple of the frequency of the current of the network.

The apparatus further comprises velocity sensing means for sensing the rotational velocity of the output shaft of the engine, and torque sensing means for sensing the output torque of the engine.

The torque control means further comprises cntrol means for receiving output signals from the velocity and torque sensing means and for controlling the rotational speed and output torque of the engine, the control means being associated with the coupling means, the switching means and the brake to control the respective operation thereof in order to conduct the necessary tests on the operational efficiency of the engine and in accordance with the possible power available to the network whereby the current supplied to the network has a frequency which is an integral multiple of the frequency of the current of the network.

The electrical power generator means according to the present invention comprises an asynchronous dynamo having at least one synchronous velocity Vs, the dynamo adapted to function as a motor or a generator.

The control means further comprises means for controlling both the brake means and the coupling means at predetermined rotational velocities whereby the torque seen by the engine remains constant.

The dynamo according to the present invention has at least two synchronous velocities Vs1 and Vs2, and the apparatus includes communication means for controlling the passage of the dynamo from one synchronous velocity to another.

The coupler according to the present invention is a Foucault current coupler adapted to be controlled by the excitation current applied thereto.

The brake means according to the present invention is a Foucault current brake adapted to be controlled by varying the excitation current applied thereto.

The apparatus further comprises measuring means for measuring the amount of power recoverable from the engine as electrical energy.

The control means further comprises means for preventing the supply of electrical energy to the network when the output of the the dynamo is not an integral multiple of the frequency of the current of the network.

In accordance with the invention, the apparatus is in combination with the engine.

In accordance with the invention, there is also an apparatus for applying a constant torque to the output shaft of an engine comprising a brake means for applying a braking torque to the shaft, coupling means, and means for varying the degree of coupling of the coupling means to output shaft whereby a constant torque is applied to the shaft.

In accordance with the present invention, there is also disclosed a process for recovering energy, in the form of electrical power, from a engine on a test bench, the test bench including a brake coupled to the output shaft of the engine, an electromagnetic coupler for varying the degree of coupling of the output shaft to an asynchronous dynamo adapted to function as a generator or a motor, and control means for controlling the operation of the brake, engine, coupler and dynamo, the process comprising the steps of applying a braking torque to the output shaft of the engine solely by means of the brake when the output velocity of the engine is less than a predetermined synchronous velocity Vs1 of the asynchronous dynamo adapted to function as either a motor or a generator, progressively removing the braking torque applied by the brake while simultaneously increasing the degree of coupling of the output shaft of the engine to the asynchronous dynamo when the output velocity of the engine approaches the predetermined synchronous velocity Vs1 so that the torque, as seen by the engine, remains constant and only the dynamo is coupled to the output shaft at velocities greater than or equal to Vs1, and operating the dynamo as an electric power generator.

The process further comprises the step of progressively decreasing the degree of coupling of the output shaft of the engine to the dynamo and simultaneously increasing the braking torque applied by the brake when the output velocity of the engine falls below the predetermined synchronous velocity Vs1 so that the torque, as seen by the engine, remains constant and only the brake is in operation for velocity less than Vs1.

The process further comprises the steps of coupling the dynamo to the output shaft of the engine at the beginning of the test, and operating the dynamo as a motor for velocities less than the predetermined velocity Vs1.

The process further comprises the steps of progressively removing the braking torque applied by the brake while simultaneously increasing the degree of coupling of the output shaft of the engine to the asynchronous dynamo so that only the dynamo is coupled to the output shaft of the engine at a velocity V2 slightly greater than the synchronous velocity Vs1.

The process further comprises the step of performing the necessary measurements on the efficiency of the engine during the test.

The process further comprises the steps of operating the dynamo as an electric power generator until a predetermined velocity Vs3 greater then the velocity V2, and controlling the degree of coupling of the dynamo to the output shaft to provide an electrical current having a frequency which is an integral multiple of the frequency of the current of the network to be supplied.

The process further comprises the steps of progressively decreasing the degree of coupling of the dynamo and simultaneously increasing the braking torque of the brake beginning at the velocity V3 and until a velocity V4 greater than V3 so that the torque as seen by the engine remains constant and only the brake is in operation at velocity V4, switching the asynchronous dynamo to a second synchronous velocity Vs2 when the velocity of the engine is between the velocity V4 and a velocity V5 greater than or equal to the synchronous velocity Vs2, progressively removing the braking torque of the brake and simultaneously increasing the degree of coupling of the coupler to the dynamo beginning at the velocity V5 and until a velocity V6 greater than V5 so that a constant torque is seen by the engine and only the coupler is in operation at velocity V6, and operating the dynamo as an electric generator.

The process further comprises the step of progressively decreasing the degree of coupling of the engine to the dynamo and simultaneously increasing the braking torque applied by the brake when the velocity of the output shaft of the engine falls below velocity V6 so that only the brake is in operation when the velocity of the output shaft is between velocities V4 and V5.

The process further comprises the step of conducting all of the necessary measurements for testing the efficiency of the engine.

The process further comprises the step of repeating the process for all synchronous velocities of the asynchronous dynamo greater than Vs2.

The process further comprises the step of disengaging the dynamo when the network cannot receive the maximum energy recoverable from the dynamo.

BRIEF DESCRIPTION OF THE APPLICATION DRAWINGS

The invention will be better understood from a reading of the description which follows with reference to the application drawings, in which:

FIG. 1 schematically illustrates a test bench provided with a device according to the invention;

FIG. 2 is a simplified diagram of the energy recovery curve obtained with the apparatus according to FIG. 1; and FIG. 3 is a diagram of the torque of an asynchronous machine as a function of the velocity.

DETAILED DESCRIPTION OF THE PREFERRED EMBODIMENTS

Figure 1:
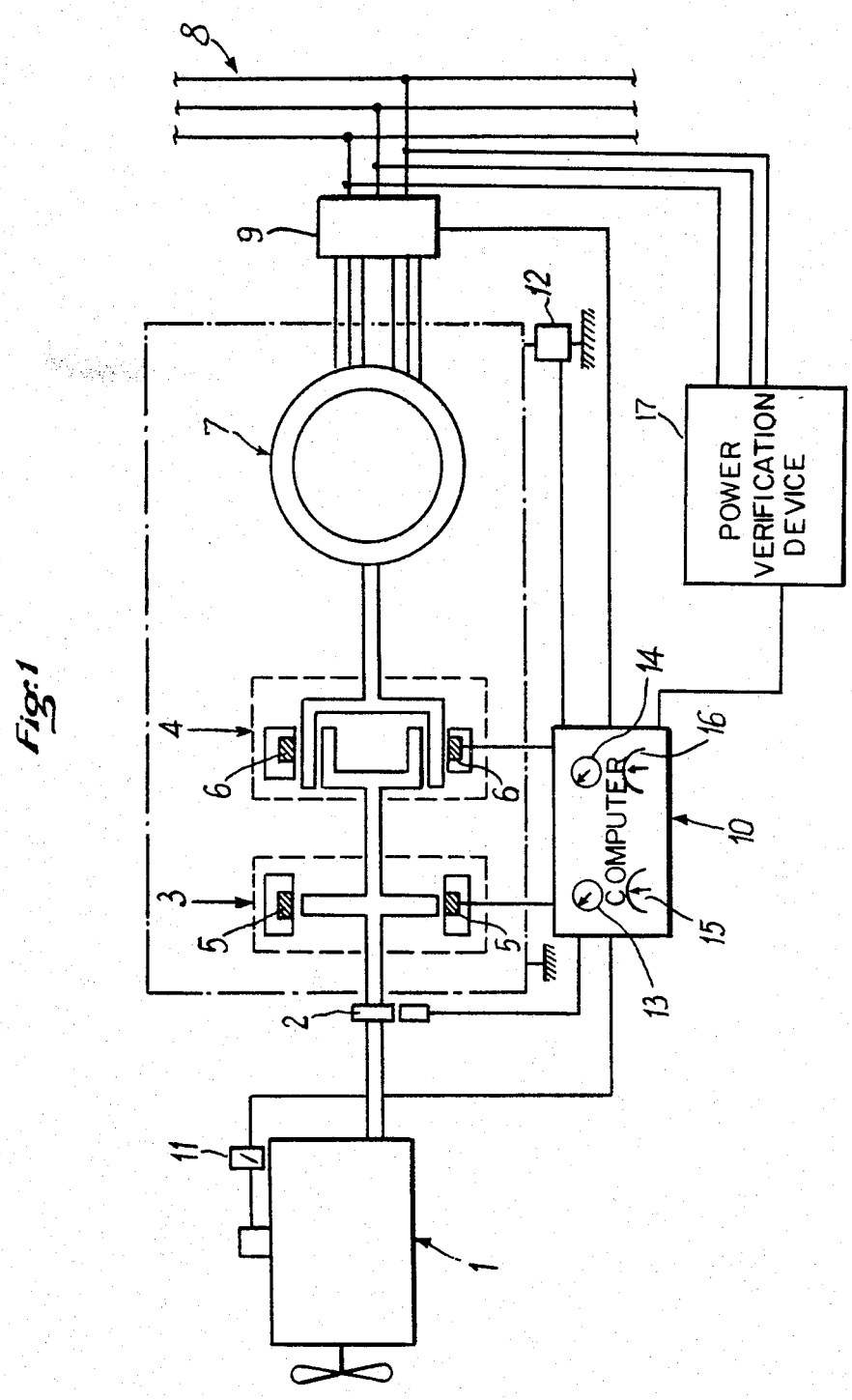

FIG. 1 illustrates a thermal engine 1 being tested provided at the output drive shaft with a rotational velocity sensor or tachometer 2. The rotational velocity sensor 2 comprises a shaft encoder capable of sensing the speed of rotation of the drive shaft by means of, for example, an optical, mechanical, electrical, or electromechanical sensing arrangement. The drive shaft is coupled to a brake-coupler assembly, generally indicated at 3 and 4. The brake 3 and the coupler 4 are preferably electromagnetic having Foucault currents, and are thus provided with excitation reels 5 and 6 respectively.

Coupler 4 is coupled at the output to an asynchronous dynamo or motor/generator 7 preferably having two predetermined synchronous velocities (Vs1) and (Vs2). The dynamo is a machine capable of translating electrical energy into mechanical energy, or vice versa. A feature of all dynamo-machines is the employment of magnetic inductance in effecting the transformation. The essential parts of the ordinary dynamo are the armature and the field. One of these is mounted on a rotating shaft; the other is stationary. Thus, the dynamo is, theoretically, perfectly reversible; that is, it may be used as a generator, or as a motor.

The asynchronous motor/generator or dynamo 7 is hooked to the energy distribution network 8 of the factory by means of a switching arrangement or contactors 9 which furthermore allow for the passage from one of the asynchronous velocities to the other.

An electronic control and operating mechanism, such as a computer controller apparatus 10, is provided which is connected to the excitation reels 5 and 6 of the brake 3 and of the coupler 4, to the switching arrangement 9, and to the rotational velocity sensor 2. The controller 10 is also associated with an accelerator control 11 of the engine 1 and a torque sensing apparatus, schematically shown at 12.

In order to perform the different desired measurements, the controller 10 is particularly provided with two manual set point adjustments 13 and 14 for setting the velocity and the torque, respectively. It is likewise provided with a manual-automatic commutator 15 and with a control 16 for operation by regulation of the velocity or of the torque.

It is thus possible, manually, to perform the desired measurements by displaying the desired set points. By automatic regulation of the velocity, the velocity set point assures a control which sets the load, (i.e., the brake-coupler excitation), while a torsion set point assures a verification of the accelerator control 11.

By torque regulation, the velocity set point assures a verification of the accelerator control and a torque set point controls the brake/coupler excitation (by thus playing on the load).

As in all test benches, it is thus possible to assure all of the measurements, at maximum or less than maximum power, by regulation of the torque (i.e., variable velocity) or by regulation of the velocity (i.e., variable torque).

To well understand the operation of the device, it is worthwhile remembering the following known characteristics:

The electromagnetic coupler does not result in a loss of torque.

The torque of the coupler is substantially proportional to its excitation current.

The maximum couple of the asynchronous motor/generator or dynamo at its synchronous velocity is selected to be at least as great as the maximum couple of the thermal engine.

Figure 3:
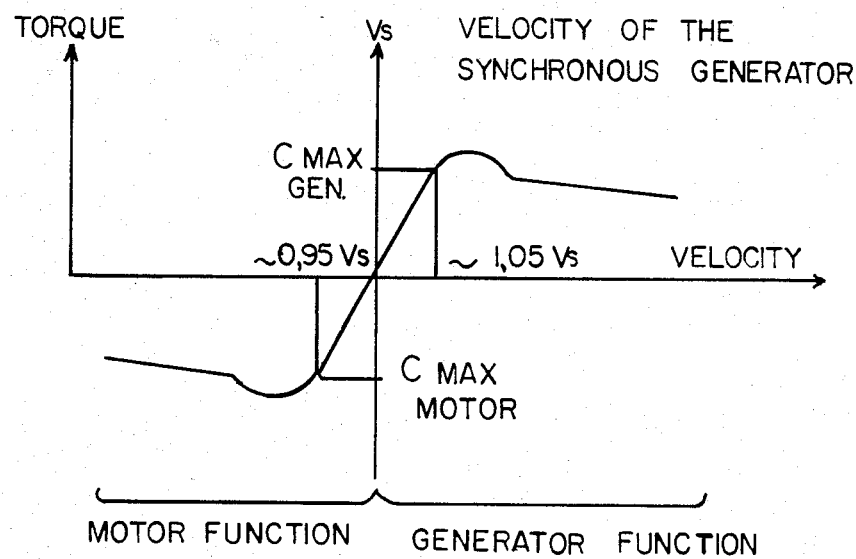

The curve of the couple of an asynchronous motor/generator or dynamo as a function of its velocity is substantially linear adjacent to the synchronous velocity (see FIG. 3).

The asynchronous motor/generator or dynamo operates as a motor (consumption of energy) below its synchronous velocity and as a generator (recovery of energy) above its synchronous velocity (see FIG. 3).

The power recovered is substantially proportional (the efficiency near the machine) to the resisting torque of the the machine, this torque being at a maximum when the velocity of the thermal engine is substantially equal to that of the generator.

The example shown in the Figures and described herein comprises an asynchronous motor/generator or dynamo 7 preferably provided with two synchronous velocities (Vs1) and (Vs2), but it is clear to one of ordinary skill in the art that it could have only one velocity or, on the contrary, more than two.

It is novel in the recovery of energy to utilize a machine having a plurality of velocities, and the problems due to the commutation of passage from one to the other are resolved by the invention by virtue of the coupler-brake utilized, as will be explained below.

The synchronous velocities (Vs1) and (Vs2) obviously depend on the frequency of the current of the electrical network to be supplied, and on the number of pairs of poles of the motor/generator or dynamo.

The example selected above shows a machine whose velocities (Vs1) and (Vs2) are, respectively, 1500 and 3,000 rpm for a network of 50 Hz.

Figure 2:
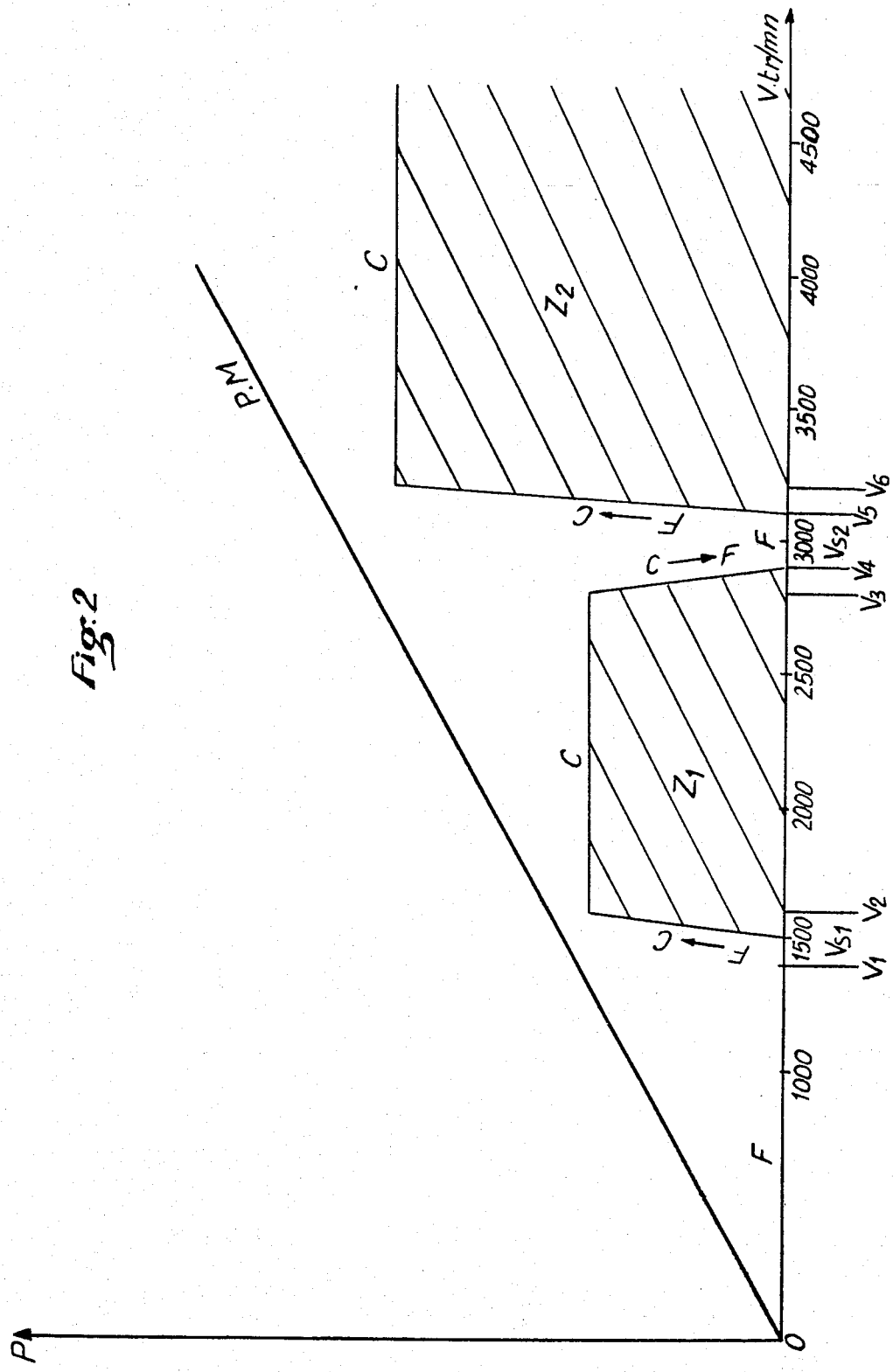

The recovery process is best illustrated by FIG. 2, which schematically shows the energy recovery curve.

Referring to FIG. 2, the rectilinear curve PM indicates the powe developed at the output of the thermal engine shaft as a function of its rotational velocity. This curve is obviously theoretical to simplify the diagram, by considering furthermore a functional torque of the engine which is constant over the entire range of velocities envisaged.

At the beginning of the test, beginning with a 0 rotational velocity, and until a velocity substantially equal to (Vs1), the placement under load of the thermal engine 1 at substantially constant torque is obtained only by the operation of the brake 3. This operation is regulated by the controller 10, which makes it possible to excite only the brake 3 when the rotational velocity indicated by the sensor 2 is less than (Vs1), i.e., 1500 rpm.

Right from the beginning, or at a velocity of (V1) less than (Vs1), the asynchronous motor/generator or dynamo 7 is connected to the electrical network to be supplied when the first synchronous velocity (Vs1) is achieved. From the time it begins operation and until the velocity (Vs1), the motor/generator or dynamo 7 is an energy consumer (motor function).

Beginning with the velocity (Vs1) the electronic controller 10 controls both the function of the brake and the coupler 4 as inverse functions of one another (i.e., by exciting more and more the coupler and less and less the brake), such that the torque, as seen by the engine, remains substantially constant (see F→C in FIG. 2).

From a velocity (V2) greater than (Vs1) to the velocity (V3) less than (Vs2), the brake 3 is completely out of operation, and only the coupler 4 is in operation (portion C of the curve), the coupler 4 now serving thus to vary the velocity. The motor/generator or dynamo 7 which operates as a generator beginning at (Vs1) thus recovers the energy (hatched zone Z1 FIG. 2).

Between the velocities (V3) and (V4) less than (Vs2), the coupler 4 and the brake 3 are controlled in a similar manner to that mentioned above (portion C→F), but in the opposite direction, such that the brake 3 alone is in operation starting at the velocity (V4) and until the velocity (V5) greater than (Vs2). Between the velocities (V4) and (V5) which can be substantially equal and vary close to (Vs2), i.e., during the braking operation only, the motor/generator or dynamo 7 is automatically commutated to its second synchronous velocity (Vs2) by means of the controller 10 and the switching assembly 9.

The operation (F→C) performed between (Vs1) and (V2) is again repeated between (V5) and a velocity (V6) such that beginning at (V6) only the coupler 4 is activated as a rotational velocity varying apparatus, the motor/generator or dynamo 7 thus recovering the energy at its synchronous velocity (Vs2) (hatched zone Z2 FIG. 2).

The diagram of FIG. 2 shows that the recovery curves do not reach the linear curve PM of the engine power, which is due, certainly, to the efficiency of the means utilized.

Such an apparatus does not make it possible to recover all of the energy available at the output of the shaft of the engine 1, the difference being dissipated in heat in the brake 3 and in the coupler 4 and in the approximate efficiency of the asynchronous motor/generator or dynamo 7 and the coupler 4 when the velocity is between (V2) and (V3) or greater than (V6).

As a function of the types of tests performed on the various engines to be tested, the average power recovered varies, beginning with a velocity which is equal to one third of the maximum velocity of the thermal engine 1, of about 40–65%. Under certain conditions of operation, the efficiency can reach about 75–80%. In the zones Z1 and Z2 of the diagram, the powers recovered are equal respectively to:

$$P1 = \frac{1500 \times C}{716} \times K \text{ and } P2 = \frac{3000 \times C}{716} \times K$$

where the power P is expressed in horsepower, C is the torque in amp m da N (meters, deca Newton) and K is a factor taking into account the efficiencies of the means utilized.

The power of the thermal engine, as represented by the curve PM, is then equal to the power recovered plus the power dissipated in heat in the brake and/or the coupler.

It is very obvious that the means utilized are adapted to the types of tests desired to obtain the best possible efficiency.

Furthermore, if the example selected shows an asynchronous motor/generator or dynamo 7 having two synchronous velocities, it is possible to utilize a machine having a single velocity or furthermore more than two velocities, as has previously been noted.

Whatever the number of synchronous velocities (limited by the frequency of the network), the electronic controller 10 allows for the commutation from one to the other without problem in the manner described above by the passage into the braking function only.

The process of operation, when the velocity decreases, it obviously in the opposite direction to that previously described.

It is furthermore possible to provide a contactor which makes it possible to suppress at will the excitation control of the coupler 4 to the extent where it is undesirable or impossible to recover energy, for example, when the tests necessitate variations in velocity which are too great or too rapid.

Preferably, as has already been explained, a power verification apparatus 17 for verification of the power of the network is provided to control the brake-coupler controller in a manner so as to ultimately control the operation of either the brake alone, or the brake and the generator, or the brake, the coupler and the generator assembly, as a function of the possible power which is admitted by the network.

Numerous variations of modifications can obviously be provided without going beyond the scope of the invention. For example, although the brake utilized is preferably an electromagnetic brake, the brake could also be of the friction type or a water brake of the Froude type, the electronic controller being adapted to regulate the means necessary to control this type of brake.

What is claimed is:

1. An apparatus for recovering energy, in the form of electrical energy, from an engine on a test bench comprising:
   (a) brake means for applying a braking torque to an output shaft of the engine;
   (b) electrical power generating means for connection to a distribution network to be supplied;
   (c) variable-speed electromagnetic coupling means for coupling said output shaft to said electrical power generating means; and
   (d) a controller for continuously monitoring and controlling said brake means and said variable-speed electromagnetic coupling means for apportioning the power produced by the engine between said coupling means and said brake means as a function of the power produced by the engine.

2. The apparatus as recited in claim 1, further comprising switching means for controlling the connection of said generating means to the network to be supplied wherein said generating means is connected to the network to supply a current having a frequency which is an integral multiple of the frequency of the current of the network.

3. The apparatus as recited in claim 2, further comprising:
   (a) velocity sensing means for sensing the rotational velocity of the output shaft of the engine; and
   (b) torque sensing means for sensing the output torque of the engine.

4. The apparatus as recited in claim 3, wherein said controller receives output signals from said velocity and torque sensing means and controls the rotational speed and output torque of the engine, said control means being associated with said coupling means, said switching means and said brake means to control the respective operation thereof in order to conduct the necessary tests on the operational efficiency of the engine and in accordance with the possible power available to the network and wherein the current supplied to the network has a frequency which is an integral multiple of the frequency of the current of the network.

5. The apparatus as recited in claim 4, wherein said electrical power generator means comprising an asynchronous dynamo having at least one synchronous velocity Vs, said dynamo adapted to function as a motor or a generator.

6. The apparatus as recited in claim 5, wherein said control means further comprises means for controlling both said brake means and said coupling means at predetermined rotational velocities whereby the torque seen by the engine remains constant.

7. The apparatus as recited in claim 6, wherein said dynamo has at least two or more synchronous velocities Vs1 and Vs2, and said apparatus includes commutation means for controlling the passage of said dynamo from one synchronous velocity to another.

8. The apparatus as recited in claim 7, wherein said coupler is a Foucault current coupler adapted to be controlled by an excitation current applied thereto.

9. The apparatus as recited in claim 8, wherein said brake means is a Foucault current brake adapted to be controlled by varying an excitation current applied thereto.

10. The apparatus as recited in claim 9, further comprising measuring means for measuring the amount of power recoverable from the engine as electrical energy.

11. The apparatus as recited in claim 10 wherein said control means further comprises means for preventing the supply of electrical energy to the network when the output of the said dynamo is not an integral multiple of the frequency of the current of the network.

12. The apparatus as recited in claim 11, in combination with the engine.

13. An apparatus for recovering energy, in the form of electrical energy, from an engine on a test bench, comprising:
   (a) brake means for applying a braking torque to an output shaft of said engine;
   (b) electrical power generating means for connection to a distribution network to be supplied;
   (c) variable-speed electromagnetic coupling means for coupling said output shaft to said electrical power generating means;
   (d) controller for controlling the speed and torque of said output shaft of said engine by controlling the start-up or shut-down time of said brake and said variable-speed electromagnetic coupler;
   (e) velocity sensing means for sensing the rotational velocity of the output shaft of the engine; and
   (f) torque sensing means for sensing the output torque of the engine.

14. An apparatus for recovering energy, in the form of electrical energy, from an engine on a test bench comprising:
   (a) brake means for applying a braking torque to an output shaft of the engine;
   (b) electrical power generating means for connection to a distribution network to be supplied;
   (c) variable-speed electromagnetic coupling means for coupling said output shaft to said electrical power generating means;
   (d) a controller for continuously monitoring and controlling said brake means and said variable-speed electromagnetic coupling means for apportioning the power produced by the engine between said coupling means and said brake means as a function of the power produced by the engine;
   (e) velocity sensing means connected to said controller for sensing rotational velocity of said output shaft of said engine; and
   (f) torque sensing means connected to said controller for sensing output torque of said engine.

15. A process for recovering energy, in the form of electrical power, from an engine on a test bench, the test bench including a brake coupled to the output shaft of the engine, an electromagnetic coupler for varying the degree of coupling of the output shaft to an asynchronous dynamo adapted to function as a generator or a motor, and control means for controlling the operation of the brake, engine, coupler and dynamo, the process comprising the steps of:
   (a) applying a braking torque to the output shaft of the engine solely by means of the brake when the output velocity of the engine is less than a predetermined synchronous velocity Vs1 of the asynchronous dynamo adapted to function as either a motor or a generator;
   (b) progressively removing the braking torque applied by the brake while simultaneously increasing the degree of coupling of the output shaft of the engine to the asynchronous dynamo when the output velocity of the engine approaches the predetermined synchronous velocity Vs1 so that the torque, as seen by the engine, remains constant and only the dynamo is coupled to the output shaft at velocities greater than or equal to Vs1; and
   (c) operating the dynamo as an electric power generator.

16. The process as recited in claim 15, comprising the step of continuously monitoring and controlling the brake and the coupler so that power produced by the engine is apportioned between the coupler and the brake as a function of the power produced by the engine.

17. The process as recited in claim 15, further comprising the step of progressively decreasing the degree of coupling of the output shaft of the engine to the dynamo and simultaneously increasing the braking torque applied by the brake when the output velocity of the engine falls below the predetermined synchronous velocity Vs1 so that the torque, as seen by the engine, remains constant and only the brake is in operation for velocity less than Vs1.

18. The process as recited in claim 17, further comprising the steps of:
   (a) coupling the dynamo to the output shaft of the engine at the beginning of the test; and
   (b) operating the dynamo as a motor for velocities less than the predetermined velocity Vs1.

19. The process as recited in claim 17, further comprising the step of progressively removing the braking torque applied by the brake while simultaneously increasing the degree of coupling of the output shaft of the engine to the asynchronous dynamo so that only the dynamo is coupled to the output shaft of the engine at a velocity V2 slightly greater than the synchronous velocity Vs1.

20. The process as recited in claim 19, further comprising the step of performing the necessary measurements on the efficiency of the engine during the test.

21. The process as recited in claim 20, further comprising the steps of:
   (a) operating the dynamo as an electric power generator until a predetermined velocity Vs3 greater then the velocity V2; and
   (b) controlling the degree of coupling of the dynamo to the output shaft to provide an electrical current having a frequency which is an integral multiple of the frequency of the current of the network to be supplied.

22. The process as recited in claim 21, further comprising the steps of:
   (a) progressively decreasing the degree of coupling of the dynamo and simultaneously increasing the braking torque of the brake beginning at the velocity V3 and until a velocity V4 greater than V3 so that the torque as seen by the engine remains constant and only the brake is in operation at velocity V4;
   (b) switching the asynchronous dynamo to a second synchronous velocity Vs2 when the velocity of the engine is between the velocity V4 and a velocity V5 greater than or equal to the synchronous velocity Vs2;
   (c) progressively removing the braking torque of the brake and simultaneously increasing the degree of coupling of the coupler to the dynamo beginning at the velocity V5 and until a velocity V6 greater than V5 so that a constant torque is seen by the engine and only the coupler is in operation at velocity V6; and (d) operating the dynamo as an electric generator.

23. The process as recited in claim 22, further comprising the step of progressively decreasing the degree of coupling of the engine to the dynamo and simultaneously increasing the braking torque applied by the brake when the velocity of the output shaft of the engine falls below velocity V6 so that only the brake is in operation when the velocity of the output shaft is between velocities V4 and V5.

24. The process as recited in claim 22, further comprising the step of conducting all of the necessary measurements for testing the efficiency of the engine.

25. The process as recited in claim 24, further comprising the step of repeating the process for all synchronous velocities of the asynchronous dynamo greater than Vs2.

26. The process as recited in claim 25, further comprising the step of disengaging the dynamo when the network cannot receive the maximum energy recoverable from the dynamo.

* * * * *